3,655,888
ANTICOCCIDIAL COMPOSITIONS
Edward C. McManus, Plainfield, and Edward F. Rogers, Middletown, N.J., assignors to Merck & Co., Inc., Rahway, N.J.
No Drawing. Continuation-in-part of application Ser. No. 775,506, Nov. 13, 1968. This application Oct. 13, 1969, Ser. No. 866,043
Int. Cl. A61k 27/00
U.S. Cl. 424—229   11 Claims

ABSTRACT OF THE DISCLOSURE

Novel anticoccidial compositions contain as an active ingredient 2-loweralkylaminoethanols where the alkyl group has at least two carbon atoms, alone or in combination with certain sulfa drugs, or sulfa drugs and 2,4-diamino-5-aryl-6-alkylpyrimidines. Of particular interest is 2-t-butylaminoethanol alone, quinoxaline or 3-allyloxy-4 - sulfanilamido - 1,2,5 - thiadiazole and 2,4 - diamino-5-(p-chlorophenyl)-6-ethylpyramidine.

---

This case is a continuation-in-part of U.S. Ser. No. 775,506 filed Nov. 13, 1968, now abandoned.

This invention relates to a novel composition for the treatment of the poultry disease coccidiosis. More specifically, it is concerned with novel anticoccidial compositions containing as an active anticoccidial agent certain 2-loweralkylaminoethanols where the alkyl group has at least two carbon atoms. It is also concerned with the method of controlling coccidiosis by the administration of such compositions to poultry.

Coccidiosis is a common and widespread poultry disease caused by species of protozoan parasites of the genus Eimeria. The most important of these species are *E. maxima, E. acervulina, E. tenella, E. necatrix* and *E. brunetti*. In turkeys, *E. meleagridis* and *E. adenoides* are also causative organisms of coccidiosis. When left untreated, the disease leads to poor weight gain, reduced feed efficiency and high mortality. For these reasons, the control of coccidiosis is highly important to the poultry industry. Although *E. tenella* and *E. necatrix* cause the most lethal forms of the disease, it is known that infections due to other species, and particularly to the so-called intestinal species such as *E. acervulina, E, brunetti* and *E. maxima*, also present a serious economic problem.

In accordance with this invention it has now been found that 2-loweralkylaminoethanols where the alkyl group has at least two carbon atoms exhibit significant activity against the poultry disease coccidiosis. These compounds also have the additional desirable property of potentiating certain sulfa drugs, or sulfa drugs in combination with 2,4-diamino-5-phenyl(or benzyl)-6-lower alkyl-pyrimidine compounds in coccidiosis control.

The 2-loweralkylaminoethanols where the alkyl group has at least two carbon atoms are highly effective in preventing the development of coccidiosis and in the treatment of existing infections, when administered to the infected animals in small amounts. Oral administration to poultry via the feedstuff or drinking water of the birds is the normal and preferred mode of administration.

One anticoccidial composition provided in accordance with this invention is a poultry feedstuff having a minor but anticoccidially effective quantity of the 2-alkylaminoethanol. Anticoccidial results are obtained when such a 2-alkylaminoethanol is administered to poultry, in an amount equal to about 0.005% to about 0.05% by weight of the daily solid feed intake. With 2-t-butylaminoethanol alone, good control of the disease is achieved with feed concentration levels in the preferred range of 0.01% to 0.05% by weight. The optimum dose level will, of course, vary somewhat depending on the specific compound employed, and the severity of coccidial infection involved. The solid finished feeds containing a coccidiostat of this invention dispersed or distributed therein are any of those usually employed in the poultry raising industry, and are nutritionally adequate ones, normally containing a source of fat, protein, carbohydrate, minerals, vitamins, and other nutritional factors. The feed containing the desired dose level of coccidiostat, i.e. percent by weight concentration, is fed ad libitum to the poultry. As will be understood by those skilled in this art, the dose level of drug administered is customarily expressed in terms of concentration in the feed of birds, rather than in terms of poultry weight.

The 2-alkylaminoethanol compounds of this invention may also be administered to poultry by way of the drinking water of the birds. When this route is used for prevention of coccidiosis, the treatment levels in the water are generally about one-half of those that would be used in a solid feedstuff, since the birds drink about twice as much as they eat. This method of treatment is advantageously employed in the therapeutic use of the compounds, since poultry infected with coccidiosis consume less solid feed than normal healthy birds. The compounds may be added directly to the drinking water. Alternatively, water-soluble powders may be prepared, in which the coccidiostat is intimately admixed with a suitable carrier, such as dextrose or sucrose, and these powders added to the drinking water of poultry as necessary. Such water-soluble powders may contain any desired concentration of the coccidiostat. Preparations containing from about 0.1–20% by weight of active compound are suitable. Liquid formulations intended for addition to the drinking water may contain minor amounts of surfactants, solubilizers, or suspending agents such as dimethylpolysiloxane, polyoxyethylene sorbitan monooleate propylene glycol.

According to a further and preferred aspect of the invention, novel anticoccidial compositions are provided which comprise the 2-alkylaminoethanol compound intimately dispersed in or admixed with an inert edible carrier or diluent. Such carrier is ordinarily an element of animal sustenance, i.e. one that is or may be an ingredient of the animal feed, and that has some degree of nutritive value for the animal. These solid compositions are the so-called feed supplements or feed premixes which contain large amounts, and which are designed for addition to the poultry feed either directly or after an intermediate dilution or blending step. Examples of nutritive carriers or diluents suitable for such compositions are animal feed ingredients such as distillers' dried grains, corn meal, citrus meal, fermentation residues, ground oyster shells, wheat shorts, molasses solubles, corn cob meal, edible vegetable substances, toasted dehulled soya flour, soybean mill feed, antibiotic mycelia, soya grits, crushed limestone, and the like. The coccidiostat is intimately dispersed or admixed throughout such solid carrier by techniques such as grinding, stirring, milling, or tumbling. By selecting proper diluents and by altering the ratio of carrier to active ingredient, compositions of any desired concentration may be prepared. Formulations containing from about 5% to about 40% by weight, and preferably from about 10–30% by weight of the anticoccidial agent are particularly suitable for addition to poultry feedstuffs. The active compound is usually dispersed or mixed uniformly in the diluent, but in some instances may be sorbed on the carrier. Since it is convenient for the feed manufacturer to use about one pound of feed supplement for each ton of finished feed, the preferred concentration in the supplement is frequently a function of the level of active ingredient desired in the finished feed.

Examples of such poultry feed supplements are:

A:                                                   Lbs.
   2-t-butylaminoethanol _____ 5.0
   Wheat middlings _____ 95.0

B:
   2-t-butylaminoethanol _____ 15.0
   Wheat shorts _____ 35.0
   Distillers' dried grains _____ 50.0

C:
   2-t-butylaminoethanol _____ 30.0
   Corn germ meal _____ 20.0
   Corn distillers' grains _____ 50.0

These supplements are prepared by mechanical milling or mixing of the ingredients to insure uniform distribution of the active compound.

The feed supplements of the type illustrated are usually further diluted with feed ingredients such as corn meal or soybean meal before being incorporated in the animal feed. In this intermediate processing step the level of coccidiostat is reduced, thus facilitating uniform distribution of the substances in the finished feed which is a nutritionally adequate one, normally containing a source of fat, protein, carbohydrate, minerals, vitamins, and other nutritional factors.

It will further be understood by those skilled in this art that special feed supplement formulations and finished animal feeds containing vitamins, antibiotics, growth-promoting agents, and other nutritional substances may include the novel anticoccidial compounds of this invention. A typical product of this type is the following:

Ingredient:                                     Amount/lb. of supplement, grams
   Riboflavin _____ 0.64
   DL–Calcium pantothenate _____ 2.10
   Niacin _____ 3.67
   Choline chloride _____ 50.00
   Vitamin $B_{12}$ concentrate _____ [1] 1.30
   Procain penicillin _____ 0.84
   Vitamin A (100,000 u./g.) _____ 3.38
   Vitamin $D_3$ (200,000 u./g.) _____ 0.68
   Arsanilic acid _____ 18.36
   Butylated hydroxytoluene _____ 23.15
   DL–Methionine _____ 23.15
   2-t-butylaminoethanol _____ 23.00
   Distillers' grains, to 1 pound.

[1] Milligram.

Specific examples of 2-alkylaminoethanols provided by this invention are 2-ethylaminoethanol, 2-isopropylaminoethanol and 2-t-butylaminoethanol. Although all of these compounds are useful in combatting coccidiosis, a preferred embodiment of the invention is 2-t-butylaminoethanol since it exhibits an unexpectedly high degree of anticoccidial activity. Since the 2-t-butylaminoethanol is the preferred embodiment of the invention, emphasis will be placed upon it in the ensuing description.

It has been found that 2-t-butylaminoethanol may be incorporated in feed compositions or in drinking water along with the sulfa drugs, in the normal diet of the birds. A ratio of 2:1 up to 1:10 by weight of the 2-alkylaminoethanol compound of this invention and the sulfa drug has been satisfactory. An amount of 2-t-butylaminoethanol of 0.0125% by weight, of the total diet ration, has been found effective as a potentiating agent. Larger amounts may be employed, if desired.

The sulfa drugs which have been found to be particularly suitable in this composition are sulfaquinoxaline, and 3-substituted-4-sulfanilamido-1,2,5-thiadiazole compounds having the formula:

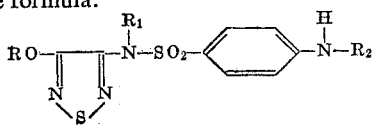

R in the above structure is loweralkenyl, such as allyl, methallyl, crotyl, loweralkynyl, such as 2-butynyl, 3-butynyl, 2-propynyl; or loweralkyl having at least two carbons, e.g. n-propyl, isopropyl, ethyl, butyl; $R_1$ is hydrogen or an alkali metal, $R_2$ is hydrogen or acyl such as benzoyl or loweralkanoyl, e.g. acetyl, propionyl, or butyryl.

When the above described coccidiostats are to be used in drinking water, it is frequently advantageous to employ a water-soluble salt. For this purpose, alkali metal salts such as the sodium or potassium salts, or alkaline earth metal salts such as the calcium and magnesium salts are preferred.

Specific examples of 3-substituted-4-sulfanilamido-1,2,5-thiadiazoles useful in this invention are 3-allyloxy-4-sulfanilamido-1,2,5-thiadiazole,
3-allyloxy-4-sulfanilamido-1,2,5-thiadiazole potassium salt,
3-allyloxy-4-($N^4$-acetylsulfanilamido)-1,2,5-thiadiazole,
3-crotyloxy-4-sulfanilamido-1,2,5-thiadiazole,
3-methallyloxy-4-($N^4$-benzoylsulfanilamido)-1,2,5-thiadiazole,
3-n-propoxy-4-sulfanilamido-1,2,5-thiadiazole,
3-n-propoxy-4-($N^4$-acetylsulfanilamido)-1,2,5-thiadiazole, sodium salt,
3-(2-propynyloxy)-4-sulfanilamido-1,2,5-thiadiazole,
3-(2-propynyloxy)-4-($N^4$-acetylsulfanilamido)-1,2,5-thiadiazole,
3-(2-butynyloxy)-4-sulfanilamido-1,2,5-thiadiazole,
3-(2-butynyloxy)-4-sulfanilamido-1,2,5-thiadiazole potassium salt, and
3-(2-butynyloxy)-4-($N^4$-acetylsulfanilamido)-1,2,5-thiadiazole.

Sulfaquinoxaline in an amount of 0.0125% up to 0.05% is used in combination with 2-t-butylaminoethanol in concentrations of 0.0125% to 0.05% in the total diet ration.

3-allyloxy-4-sulfanilamido - 1,2,5 - thiadiazole in an amount of 0.0125% to 0.05% is used in combination with 2-t-butylaminoethanol in concentrations of 0.0125% to 0.05% in the total diet ration.

In addition to the use of the 2-alkylaminoethanol compounds of this invention as anticoccidial agents alone, or in combination with the above described sulfa drugs, this invention also contemplates the use of these 2-alkylaminoethanol compounds together 2,4-diamino-5-phenyl (or benzyl)-6-lower alkyl-pyrimdine compounds, or mixtures of the latter compounds with sulfa drugs. By the term "lower alkyl" we mean alkyl having 1–6 carbon atoms. The preferred 2,4-diamino-5-phenyl(or benzyl)-6-lower alkylpyrimidine compound is 2,4-diamino-5-(p-chlorophenyl)-6-ethylpyrimidine (Daraprim®). Similarly, 2,4-diamino-5-(p-chlorophenyl)-6-methylpyrimidine, 2,4-diamino-5-(p-chlorophenyl)-6-n-propylpyrimidine, 2,4-diamino - 5 - (p-chlorophenyl)-6-n-amylpyrimidine, 2,4-diamino-5-(3,4-dimethoxybenzyl)-6-hexylpyrimidine, and 2,4-diamino-5-(3-ethoxy-4-methoxybenzyl) - 6 - ethylpyrimidine can likewise be used. These compounds may be used in drinking water and in poultry feed or feed supplement compositions. These drugs may be administered in combination or concurrently.

Effective results are obtained with a total diet ration containing 0.0125% to 0.025% of 2-t-butylaminoethanol in combination with 0.006% to 0.025% of 3-allyloxy-4-sulfanilamido-1,2,5-thiadiazole and 0.0005% to 0.001% of 2,4-diamino-5-(p-chlorophenyl)-6-ethylpyrimidine.

The combination of 0.0125% to 0.025% of 2-t-butylaminoethanol and a mixture of 0.0125% to 0.0500% of sulfanilamidoquinoxaline and 0.0005% to 0.001% of 2,4-diamino-5-(p - chlorophenyl)-6-ethylpyrimidine likewise gives effective control of coccidiosis in poultry.

The following examples are given for the purpose of illustration and not by way of limitation.

EXAMPLE 1

Straight run White Leghorn chicks, in groups of three each, were weighed and placed in cages with wire floors. They were fed ad libitum a standard laboratory ration in which graded concentrations of test compounds were blended just prior to use. Normal and infected control birds were fed basal ration containing no test compound. On the second day of the test the chicks were inoculated orally with 50,000 sporulated oocysts of *Eimeria tenella*. Papers under cages were examined on the 5th, 6th and 7th day for presence or absence of bloody droppings. A score of 0 was given if no bloody spots were observed. Scores of 1, 2 or 4 were assigned for 1–3, 4–6 and >6 bloody spots respectively. On the 7th day of the assay the surviving birds were weighed, sacrificed and examined grossly for cecal coccidiosis lesions. Normal ceca were scored 0 and ceca with detectable, moderate or maximal lesions were scored 1, 2, and 4 respectively. When a bird died, and cecal lesions were present a score of 5 was recorded. If the total of the two scores was 0–3, 4–7, 8–10 or >10 a rating of active, moderately active, slightly active, or inactive was given.

Following the above procedure 2-ethylaminoethanol, 2-isopropylaminoethanol and 2-t-butylaminoethanol were found to have a rating of "active" at the dose levels shown:

| Compounds: | Dose level, percent by weight in feed |
|---|---|
| 2-ethylaminoethanol | 0.05–0.10 |
| 2-isopropylaminoethanol | 0.025 |
| 2-t-butylaminoethanol | 0.05 |

EXAMPLE 2

Coccidiostatic activity of 2-t-butylaminoethanol was determined by the following method:

Groups of ten two-week old chicks were fed a mash diet containing graded amounts of 2-t-butylaminoethanol. The compound was uniformly dispersed in the feed. After having been on this ration for 24 hours, each chick was inoculated with 50,000 sporulated oocysts *Eimeria tenella*. Other groups of ten chicks were each fed a similar mash diet which contained no coccidiostat. These were also infected in the same manner after 24 hours and served as positive or infected controls. As positive controls, two to four groups of ten chicks each were employed. Still other groups of ten chicks each were fed the mash free of coccidiostat and were not infected with coccidiosis. These served as normal controls.

The diets were administered to the chicks for eight days following the date of infection. At the end of this time the infected birds were sacrificed. The oocylst count was determined by a microscopic examination of the cecal and intestinal homogenates.

The results employing the indicated amounts of coccidiostat compound, expressed as mean values, are set forth in the table below.

| Compound | Percent compound in feed | Percent weight gain | Mortality percent survival | No. of oocysts ×10⁻⁶ in surviving birds |
|---|---|---|---|---|
| Infected controls | | 74 | 46 | 9.8 |
| Normal controls | | 125 | 100 | <0.1 |
| BAE | 0.010 | 95 | 70 | 6.5 |
| BAE | 0.020 | 87 | 100 | 10.9 |
| BAE | 0.024 | 75 | 90 | 8.1 |
| BAE | 0.035 | 132 | 100 | 4.4 |
| BAE | 0.042 | 105 | 100 | 3.1 |
| BAE | 0.050 | 119 | 100 | 0.1 |

EXAMPLE 3

The sulfa drug potentiating action of 2-t-butylaminoethanol in coccidiosis control of birds infected with *Eimeria tenella* was experimentally demonstrated with the sulfa drug 3-allyloxy-4-sulfanilamido-1,2,5-thiadiazole, following the test method of Example 2.

| Compound | Percent compound in feed | Percent weight gain | Mortality percent survival | No. of oocysts ×10⁻⁶ in surviving birds |
|---|---|---|---|---|
| Infected controls | | 68 | 62 | 13.5 |
| Normal controls | | 131 | 100 | <0.1 |
| BAE | .0125 | 76 | 80 | 11.1 |
| BAE | .0250 | 103 | 90 | 6.6 |
| BAE | .05 | 118 | 100 | 2.0 |
| ST | .0125 | 75 | 50 | 8.9 |
| ST | .025 | 74 | 70 | 16.6 |
| ST | .0500 | 89 | 100 | 0.3 |
| ST | .1 | 108 | 100 | <0.1 |
| BAE+ST | .0125+.0125 | 94 | 100 | 4.9 |
| BAE+ST | .0125+.0250 | 119 | 100 | 0.6 |
| BAE+ST | .0125+.0500 | 114 | 100 | 1.9 |
| BAE+ST | .0250+.0125 | 124 | 100 | 3.0 |
| BAE+ST | .0250+.0250 | 135 | 100 | <0.1 |

BAE=2-t-butylaminoethanol.
ST=3-allyloxy-4-sulfanilamido-1,2,5-thiadiazole.

From the above results it is seen that using a combination of 0.025% for each of the drugs the percent weight gain is 130 and the oocyst count is <0.1 as compared with the values of 118% weight gain and an oocyst count of 2.0 at a dose level of 0.05% of 2-t-butylaminoethanol, and values of 89% weight gain, and an oocyst count of 0.3 at a dose level of 0.05% of 3-allyloxy-4-sulfanilamido-1,2,5-thiadiazole.

At a dose level of 0.025% for each of the drugs the relative weight gain, survival and oocyst count are approximately the same as that for normal controls.

EXAMPLE 4

The sulfa drug potentiating action of 2-t-butylaminoethanol for sulfanilamidoquinoxaline was demonstrated in coccidiosis control of birds infected with *Eimeria tenella* in drinking water or feed following the test method of Example 2.

| Compound | Percent compound in feed | Percent weight gain | Mortality percent survival | No. of oocysts ×10⁻⁶ in surviving birds |
|---|---|---|---|---|
| A. Water medication (prophylactic): | | | | |
| BAE | .0100 | 98 | 90 | 4.8 |
| BAE | .0200 | 106 | 100 | 4.3 |
| SQ | .0125 | 98 | 90 | 6.8 |
| SQ | .0250 | 95 | 100 | <0.1 |
| SQ | .0500 | 85 | 100 | <0.1 |
| BAE+SQ | .0050+.0060 | 112 | 80 | 5.9 |
| BAE+SQ | .0050+.0125 | 120 | 100 | 0.5 |
| BAE+SQ | .0050+.0250 | 115 | 100 | <0.1 |
| BAE+SQ | .0075+.0060 | 126 | 100 | 0.1 |
| B. Feed medication (prophylactic): | | | | |
| BAE | .0100 | 83 | 80 | 5.9 |
| BAE | .0200 | 103 | 70 | 9.5 |
| SQ | .0250 | 95 | 80 | 4.9 |
| SQ | .0500 | 110 | 100 | 0.6 |
| BAE+SQ | .0100+.0125 | 110 | 100 | 5.5 |
| BAE+SQ | .0100+.0500 | 118 | 100 | <0.1 |
| BAE+SQ | .0150+.0125 | 98 | 100 | 4.6 |
| BAE+SQ | .0150+.0250 | 100 | 100 | 3.3 |
| BAE+SQ | .1500+.0500 | 108 | 100 | 0.2 |
| BAE+SQ | .0200+.0125 | 114 | 100 | 0.5 |
| BAE+SQ | .0200+.0250 | 124 | 100 | <0.1 |
| BAE+SQ | .0200+.0500 | 114 | 100 | <0.1 |
| Infected controls | | 69 | 67 | 12.7 |
| Normal controls | | 120 | 100 | 0.1 |

BAE=2-t-butylaminoethanol.
SQ=Sulfanilamidoquinoxaline.

The following average values for percent weight gain, gross lesions, oocyst count and percent survival are found to be statistically significantly different for the combined drugs at concentrations of 0.04% for sulfanilamidoquinoxaline and 0.0125% for 2-t-butylaminoethanol, as compared with 0.08% for sulfanilamidoquinoxaline and 0.025% for t-butylaminoethanol separately.

| Compound | Percent compound in feed | Percent weight gain | Gross lesions | Oocysts per bird 10⁻⁶ | Percent surviva |
|---|---|---|---|---|---|
| BAE | 0.025 | 93.4 | 2.71 | 3.16 | 96.5 |
| SQ | 0.08 | 88.7 | 2.52 | <0.1 | 97.4 |
| BAE+SQ | 0.0125+0.04 | 104.7 | 0.56 | <0.1 | 100.0 |

BAE=2-t-butylaminoethanol.
SQ=Sulfanilamidoquinoxaline.

EXAMPLE 5

The effectiveness of 2-t-butylaminoethanol in combination with 2,4-diamino-5-(p-chlorophenyl)-6-ethylpyrimidine, or in combination with a mixture of the sulfa drug 3 - allyloxy - 4 - sulfanilamido-1,2,5-thiadiazole and 2,4-diamino-5-(p-chlorophenyl)-6-ethylpyrimidine in coccidiosis control of birds infected with *Eimeria tenella* was experimentally determined following the test method of Example 2.

| Compound | Percent compound in feed | Percent weight gain | Mortality percent survival | No. of oocysts ×10⁻⁶ in surviving birds |
|---|---|---|---|---|
| Infected controls | | 71 | 68 | 16.6 |
| Normal controls | | 138 | 100 | <0.1 |
| BAE | .0125 | 66 | 90 | 10.5 |
| BAE | .0250 | 92 | 100 | 4.0 |
| DAR | .0005 | 80 | 60 | 18.0 |
| DAR | .0010 | 33 | 20 | 20.1 |
| ST | .0125 | 94 | 80 | 6.8 |
| ST | .0250 | 102 | 70 | 4.3 |
| ST | .0500 | 112 | 100 | 0.2 |
| BAE+DAR | .0250+.0010 | 112 | 100 | 3.3 |
| BAE+DAR+ST | .0125+.0010+.0060 | 126 | 80 | 8.2 |
| BAE+DAR+ST | .0125+.00050+.0125 | 129 | 100 | <0.1 |
| BAE+DAR+ST | .0125+.0010+.0125 | 118 | 100 | <0.1 |

BAE=2-t-butylaminoethanol.
ST=3-allyloxy-4-sulfanilamido-1,2,5-thiadiazole.
DAR=2,4-diamino-5-(p-chlorophenyl)-6-ethylpyrimidine (Daraprim ®).

The above data show that efficient anticoccidial chemotherapeutic agents may be developed from a combination of 2-t-butylaminoethanol with a mixture of a sulfa drug and Daraprim®, which drug mixtures have an anticoccidial effect for susceptible species of parasites. Economics may be made through the more efficient use of combinations of these drugs.

EXAMPLE 6

The effectiveness of 2-t-butylaminoethanol in combination with the sulfa drugs sulfanilamidoquinoxaline or 3-allyloxy-4-sulfanilamido-1,2,5-thiadiazole, or in combination with a mixture of the latter sulfa drug and 2,4-diamino-5-(p-chlorophenyl) - 6 - ethylpyrimidine in the coccidiosis control of birds infected with a mixed species of *Eimeria tenella* and *Eimeria necatrix* was experimentally shown following the test method of Example 2.

| Compound | Percent compound in feed | Percent weight gain | Mortality percent survival | No. of oocysts ×10⁻⁶ in surviving birds |
|---|---|---|---|---|
| Infected controls | | 63 | 56 | 23.9 |
| Normal controls | | 97 | 100 | 0.2 |
| BAE | .0125 | 89 | 100 | 16.4 |
| BAE | .0250 | 95 | 80 | 14.2 |
| BAE | .0500 | 103 | 100 | 0.4 |
| ST | .0125 | 70 | 80 | 20.2 |
| ST | .0250 | 71 | 60 | 7.8 |
| ST | .0500 | 84 | 100 | 5.6 |
| ST | .1000 | 86 | 100 | 0.2 |
| SQ | .0125 | 68 | 100 | 26.2 |
| SQ | .0250 | 67 | 70 | 39.7 |
| SQ | .0500 | 96 | 90 | 11.4 |
| SQ | .1 | 79 | 100 | 5.9 |
| DAR | .0005 | 80 | 40 | 11.0 |
| DAR | .0010 | 68 | 60 | 7.8 |
| BAE+ST | .0125+.0060 | 95 | 100 | 10.4 |
| BAE+ST | .0125+.0125 | 104 | 90 | 10.6 |
| BAE+ST | .0125+.0250 | 115 | 100 | 3.5 |
| BAE+SQ | .0125+.0125 | 75 | 90 | 9.7 |
| BAE+SQ | .0125+.0250 | 96 | 90 | 11.2 |
| BAE+SQ | .0125+.0500 | 91 | 90 | <0.1 |
| BAE+ST+DAR | .0125+.0060+.005 | 105 | 90 | 3.2 |
| BAE+ST+DAR | .0125+.0125+.005 | 121 | 100 | 0.8 |
| BAE+ST+DAR | .0125+.0250+.0005 | 85 | 100 | 1.1 |
| BAE+SQ+DAR | .0125+.0125+.0005 | 94 | 100 | 1.8 |
| BAE+SQ+DAR | .0125+.0250+.0005 | 105 | 100 | <0.1 |
| BAE+SQ+DAR | .0125+.0500+.0005 | 130 | 100 | 0.1 |

BAE=2-t-butylaminoethanol.
ST=3-allyloxy-4-sulfanilamido-1,2,5-thiadiazole.
SQ=Sulfanilamidoquinoxaline.
DAR=2,4-diamino-5-(p-chlorophenyl)-6-ethylpyrimidine (Daraprim ®).

The above data show that efficient anticoccidial chemotherapeutic agents may be developed from a combination of 2-t-butylaminoethanol with a mixture of a sulfa drug and Daraprim®, which drug mixtures have an antiococcidial effect for susceptible species of parasites. Economics may be made through the more efficient use of combinations of drugs.

Any departure from the above description which conforms to the present invention is intended to be included within the scope of the claims.

What is claimed is:

1. An anticoccidial composition comprising a poultry feedstuff containing an anticoccidially effective amount of a 2-loweralkylaminoethanol where the alkyl group has at least two carbon atoms and an additional anticoccidial amount of a sulfa drug, said sulfa drug being sulfaquinoxaline or a compound having the formula

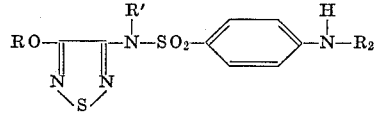

wherein R is loweralkenyl, loweralkynyl, or loweralkyl having at least 2 carbon atoms, $R_1$ is hydrogen or an alkali metal, and $R_2$ is hydrogen, loweralkanoyl, or benzoyl.

2. A composition according to claim 1 wherein said sulfa drug is sulfaquinoxaline.

3. A composition according to claim 1 wherein said sulfa drug is a compound having the formula:

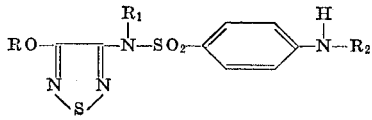

where R represents loweralkenyl, loweralkynyl or loweralkyl having at least 2 carbon atoms, $R_1$ is hydrogen or an alkali metal, and $R_2$ is hydrogen, lower alkanoyl or benzoyl.

4. A composition according to claim 9 wherein said sulfa drug is 3-allyloxy-4-sulfanilamido-1,2,5-thiadiazole.

5. A composition according to claim 1 wherein said active antiococcidial ingredient is a combination of about 0.025% to 0.05% of sulfaquinoxaline and about 0.005% to 0.01% of 2-t-butylaminoethanol in the total diet ration.

6. A composition according to claim 1 wherein said active anticoccidial ingredient is a combination of about 0.0125% to 0.05% of 3 - allyloxy-4-sulfanilamido-1,2,5-thiadiazole and about 0.0125% to 0.05% to 2-t-butylaminoethanol in the total diet ration.

7. A composition according to claim 1 wherein an anticoccidial amount a 2,4-diamino-5-phenyl (or benzyl)-6-lower alkyl-pyrimidine compound is also present as an additional anticoccidial ingredient.

8. A composition according to claim 7 wherein said pyrimidine compound is 2,4-diamino-5-(p-chlorophenyl)-6-ethylpyrimidine.

9. A composition according to claim 7 wherein said active anticoccidial ingredient is a mixture of about 0.0125% to 0.025% of 2-t-butylaminoethanol, 0.0125% to 0.05% of sulfanilamidoquinoxaline and 0.0005% to 0.001% of 2,4 - diamino - 5 - (p - chlorophenyl)-6-ethylpyrimidine.

10. A composition according to claim 7 wherein said anticoccidial ingredient is a mixture of about 0.0125% to 0.025% of 2-t-butylaminoethanol, 0.006% to 0.025% of 3-allyloxy-4-sulfanilamido-1,2,5-thiadiazole and 0.0005% to 0.001% of 2,4-diamino-5-(p-chlorophenyl) - 6 - ethylpyrimidine.

11. The method of combatting poultry coccidiosis which comprises the daily oral administration to poultry having coccidiosis of a poultry feedstuff containing between 0.005 and 0.05% by weight of a 2-loweralkylaminoethanol where the alkyl group has at least 2 carbon atoms.

References Cited
UNITED STATES PATENTS

| | | | |
|---|---|---|---|
| 2,383,564 | 8/1945 | Ralston et al. | 424—325 |
| 3,167,475 | 1/1965 | Gottfried et al. | 424—325 |

OTHER REFERENCES

Jukes et al., Chem. Abst., vol. 40 (1946), p. 9249.

SAM ROSEN, Primary Examiner

U.S. Cl. X.R.

424—251, 325